(12) United States Patent
Sherrill et al.

(10) Patent No.: US 7,373,252 B2
(45) Date of Patent: May 13, 2008

(54) 3D PRE-STACK FULL WAVEFORM INVERSION

(75) Inventors: Francis Garrou Sherrill, Katy, TX (US); Subhashis Mallick, Missouri City, TX (US)

(73) Assignee: Western Geco L.L.C., Houston, TX (US)

( * ) Notice: Subject to any disclaimer, the term of this patent is extended or adjusted under 35 U.S.C. 154(b) by 29 days.

(21) Appl. No.: 11/556,037

(22) Filed: Nov. 2, 2006

(65) Prior Publication Data

US 2007/0203673 A1 Aug. 30, 2007

Related U.S. Application Data

(60) Provisional application No. 60/733,404, filed on Nov. 4, 2005.

(51) Int. Cl.
 *G01V 1/28* (2006.01)
(52) U.S. Cl. .................................................. 702/17
(58) Field of Classification Search .................. 702/14, 702/17, 18
See application file for complete search history.

(56) References Cited

U.S. PATENT DOCUMENTS 6,826,484 B2 * 11/2004 Martinez et al. .............. 702/14

OTHER PUBLICATIONS

Berg, "Convergent genetic algorithm for inversion," *61st Ann. Intern. Mtg., Soc. Expl. Geophys.*, Expanded Abstracts, 948-950, 1991.

Berg, "Simple convergent genetic algorithm for inversion of multiparameter data," *60th Ann. Intern. Mtg., Soc. Expl. Geophys.*, Expanded Abstracts, 1126-1128, 1990.

Frazer and Basu, "Freeze-bath inversion," *60th Ann. Intern. Mtg., Soc. Expl. Geophys.*, Expanded Abstracts, 1123-1125, 1990.

Hampson and Russell, "AVO inversion: theory and practice," *60th Ann. Intern. Mtg., Soc. Expl. Geophys.*, Expanded Abstracts, 1456-1458, 1990.

Irigber and Rosen, "Genetic algorithms and very fast simulated reannealing: a comparison," *Mathematical and Computer Modelling*, 16(11):87-100, 1992.

(Continued)

*Primary Examiner*—Donald E McElheny, Jr.
(74) *Attorney, Agent, or Firm*—Jeffrey A. Pyle; Liangang (Mark) Ye; Jeffrey E. Griffin (57) ABSTRACT

A method, comprising: generating a macro P-wave velocity model, including resolution of residual moveout errors, using reflection tomography from a seismic data set; generating a diffraction response from the macro P-wave velocity model for a given common image gather location therein assuming a locally laterally invariant model; converting the generated diffraction response for the given common image gather location to a migrated reflection response to yield a modeled data set; comparing the modeled data set to the given common image point from the seismic data set; updating the macro P-wave velocity model based on the result of the comparison; and iterating the diffraction response generation, the diffraction response conversion, comparison, and update until the modeled data set converges to the common image gathers. This method is an extension of the 1D waveform inversion where the correct source/receiver positions are determined in a locally laterally invariant medium by backprojecting raypaths from each image point using the local dip at that image point.

18 Claims, 7 Drawing Sheets

OTHER PUBLICATIONS

Kirkpatrick, Gelatt, Jr. and Vecchi, "Optimization by simulated annealing," *Science*, 220(4598):671-680, 1983.

Mallick, "Inversion of amplitude-versus-offset data using a genetic algorithm" *62nd Ann. Intern. Mtg., Soc. Expl. Geophys.*, Expanded Abstracts, 844-847, 1992

Mallick, "Model-based inversion of amplitude-variations-with-offset data using a genetic algorithm," *Geophysics*, 60(4):939-954, 1995.

Mallick, "Practical aspects of reflectivity modeling," *Geophysics*, 52(10):1355-1364, 1987.

Mallick and Frazer, "Rapid computation of multioffset vertical seismic profile synthetic seismograms for layered media," *Geophysics*, 53(4):479-491, 1988.

Mallick, "Some practical aspects of prestack waveform inversion using a genetic algorithm: an example from the east Texas Woodbine gas sand," *Geophysics*, 64(2):326-336, 1999.

Mallick, "Waveform inversion of amplitude-versus-offset data using a genetic algorithm," *63rd Ann. Intern. Mtg., Soc. Expl. Geophys.*, Expanded Abstracts, 750-753, 1993.

Rothman, "Automatic estimation of large residual statics corrections," *Geophysics*, 51(2):332-346, 1986.

Rothman, "Nonlinear inversion, statistical mechanics, and residual statics estimation," *Geophysics*, 50(12):2784-2796, 1985.

Sen and Stoffa, "Genetic inversion of AVO," *The Leading Edge*, 11:27-29, 1992.

Sen and Stoffa, "Nonlinear one-dimensional seismic waveform inversion using simulated annealing," *Geophysics*, 56(10):1624-1638, 1991.

Sherrill et al., "Improving AVO and reflection tomography through use of local dip and azimuth," *71st Ann. Intern. Mtg., Soc. Expl. Geophys.*, 273-276, 2001.

* cited by examiner

3D PRE-STACK FULL WAVEFORM INVERSION

This application claims the earlier effective filing date of co-pending Provisional U.S. patent application, Ser. No. 60/733,404, entitled 3D PRE-STACK FULL WAVEFORM INVERSION, filed on Nov. 4, 2005, by Francis G. Sherrill and Subhashis Mallick.

BACKGROUND OF THE INVENTION

1. Field of the Invention

The present invention pertains to seismic surveying and, more particularly, to a technique for use in analyzing the resultant information.

2. Description of the Related Art

Seismic exploration is conducted both on land and in water. In both environments, exploration involves surveying subterranean geological formations for hydrocarbon deposits. A survey typically involves deploying acoustic source(s) and acoustic sensors at predetermined locations. The sources impart acoustic waves into the geological formations. Features of the geological formation reflect the acoustic waves to the sensors. The sensors receive the reflected waves, which are detected, conditioned, and processed to generate seismic data. Analysis of the seismic data can then indicate probable locations of the hydrocarbon deposits.

One technique for analyzing the seismic data is called amplitude variation with offset ("AVO"). AVO is a variation in seismic reflection amplitude with change in distance between a source and a receiver that indicates differences in lithology and fluid content in rocks above and below the reflector. AVO analysis is a technique by which geophysicists attempt to determine characteristics of the geological formation such as thickness, porosity, density, velocity, lithology and fluid content of rocks. Successful AVO analysis employs certain well-known techniques for processing seismic data and seismic modeling of the seismic data to determine rock properties with a known fluid content. With that knowledge, it is possible to model other types of fluid content.

Seismic modeling is the comparison, simulation or representation of seismic data to define the limits of seismic resolution, assess the ambiguity of interpretation or make predictions. Generation of a synthetic, or modeled, seismogram from a well log and comparing the synthetic, or modeled trace, with seismic data is a common direct modeling procedure. Generating a set of pseudologs, or synthetic data, from seismic data is the process known as seismic inversion, a type of indirect modeling. Models can be developed to address problems of structure and stratigraphy prior to acquisition of seismic data and during the interpretation of the data. One type of inversion is pre-stack waveform inversion ("PSWI").

The interest shown by exploration seismologists in amplitude-variation-with-offset ("AVO") analysis for the direct detection of hydrocarbons from seismic data has been growing over the past few years. Reflection records of prestack seismic data contain valuable amplitude information that can be related to the subsurface lithology. With the increasing popularity of AVO, considerable work has also been carried out on the AVO inversion, and the fundamental problem of non-uniqueness associated with such an inversion is now well recognized. See, e.g., Hampson, D., "AVO Inversion, Theory, and Practice", 10 The Leading Edge, 39-42 (1991); Sen, M. K., and Stoffa, P. L., "Genetic Inversion of AVO", 11 The Leading Edge," 27-29 (1992).

Thus, both AVO and PSWI have been used for a number of years. Walden, AT., "Making AVO Sections More Robust", 39 Geophysical Prospecting, 915-942 (1991), described a method for angle decomposition using a zero dip assumption as may be used in AVO. Mallick, S., "Model-Based Inversion of Amplitude-Variation-With-Offset Data Using a Genetic Algorithm," 60 Geophysics, 939-954 (1995) ("Subhashis") presented a method for PSWI, also with the assumption of zero reflector dip.

The pre-stack waveform inversion method described by Subhashis assumes that the input common image gathers are migrated with the correct velocity, but does not describe a method for determining the correct velocity field. More precisely, the PSWI technique of Subhashis is a genetic algorithm which attempts to match observed pre-stack seismic data by forward modeling using a trial velocity field. This trial velocity field, which must be laterally invariant, is perturbed until the modeled data matches the observed data as closely as possible. The velocity field which yields the optimum match is the output from the inversion. The input data is normally a pre-stack time migrated ("PSTM") gather, and the inversion is independent for each gather. The method is often referred to as a 1D ("one-dimensional") inversion which is not strictly true since the input to the process is 3D PST1M gathers. A more accurate term for the inversion would be zero dip, since the forward modeling uses zero for the reflector dip.

The present invention is directed to resolving, or at least reducing, one or all of the problems mentioned above.

SUMMARY OF THE INVENTION

A method, comprising: generating a macro P-wave velocity model, including resolution of residual moveout errors, using reflection tomography from a seismic data set; generating a diffraction response from the macro P-wave velocity model for a given common image gather location therein assuming a locally laterally invariant model; converting the generated diffraction response for the given common image gather location to a migrated reflection response to yield a modeled data set; comparing the modeled data set to the given common image point from the seismic data set; updating the macro P-wave velocity model based on the result of the comparison; and iterating the diffraction response generation, the diffraction response conversion, comparison, and update until the modeled data set converges to the common image gathers. This method is an extension of the 1D waveform inversion where the correct source/receiver positions are determined in a locally laterally invariant medium by backprojecting raypaths from each image point using the local dip at that image point.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
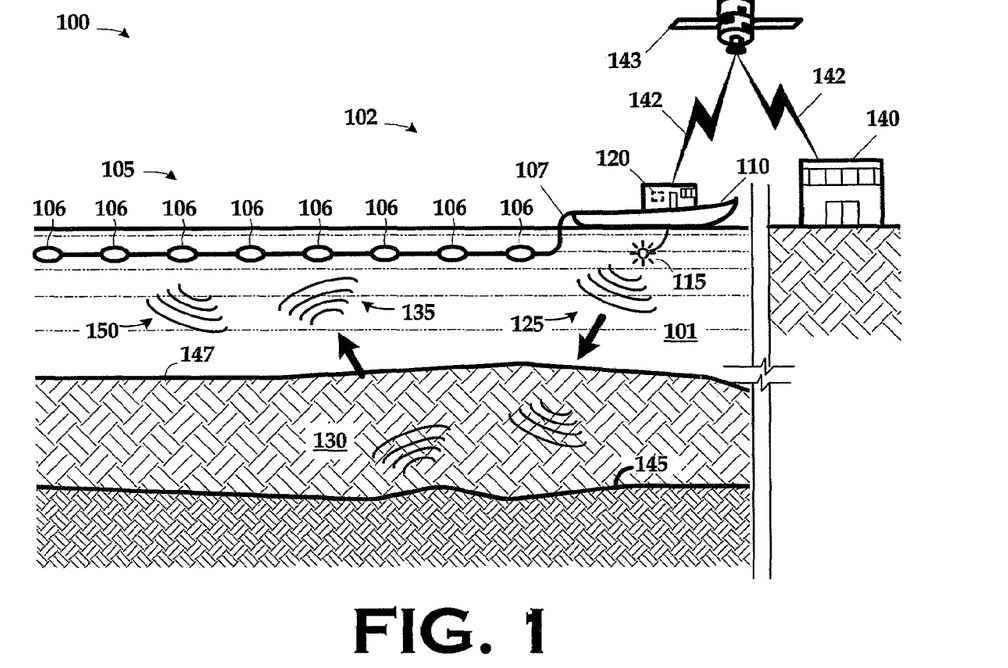
FIG. 1 depicts a marine seismic survey practiced in accordance with the present invention.
Figure 2:
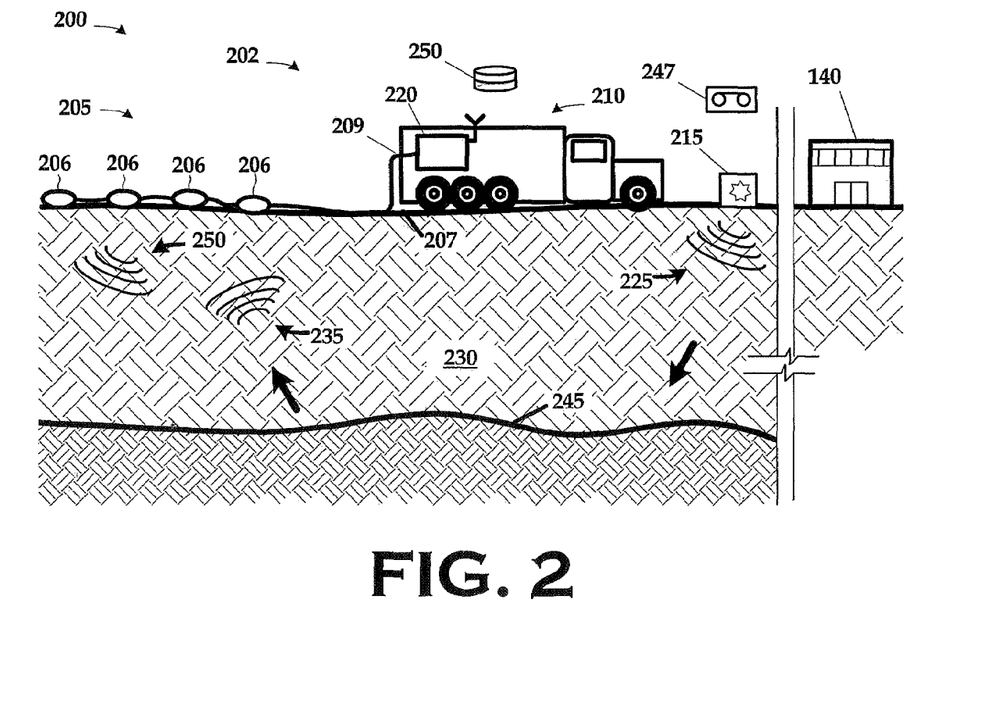
FIG. 2 depicts a land-based seismic survey practiced in accordance with the present invention.

The present invention comprises a method and apparatus for use in processing seismic data. The invention admits wide variation in the type of seismic data with which it may be used. For instance, the seismic data may be acquired through either a land-based or a marine seismic survey. FIG. 1 and FIG. 2, discussed more fully below, discuss exemplary seismic surveys by which seismic data may be acquired. In general, the present invention will yield relatively poorer results in transition zone surveys because of the behavior of the reflections, although the invention may nevertheless find application in such surveys and in data from such surveys.

FIG. 1 illustrates an exemplary marine seismic survey 100. The marine seismic survey 100 may be conducted in virtually any body of water. Thus, in accordance with usage in the art, the term "marine" does not necessarily imply a saltwater acquisition environment. The water 101 may be saltwater, fresh water, or brackish water. The marine seismic survey 100 employs a seismic survey system 102 by which seismic data may be acquired for processing in accordance with the present invention. The seismic survey system 102 includes a seismic recording array 105 and may be constructed in accordance with conventional practice. The recording array 105 includes a plurality of receivers 106 comprising a portion of at least one seismic streamer 107. As those in the art having the benefit of this disclosure will appreciate that most embodiments will typically employ multiple seismic streamers 107 arrayed behind the survey vessel 110. The receivers 106 are implemented, in the illustrated embodiment, with, e.g., hydrophones as are known to the art.

FIG. 1 also shows a seismic source 115 and a data collection unit 120. The seismic source 115 may be a vibroseis source, such as a marine vibrator, or an impulse source, such as explosives or an air gun, as are known in the art. Note that embodiments may employ multiple sources 115 in arrays using techniques known to the art. Those skilled in the art will realize that the embodiments illustrated herein can be extrapolated to apply the present invention to embodiments employing multiple seismic sources 115. The data collection unit 120 is centrally located on the survey vessel 110. However, as will be appreciated by those skilled in the art, various portions of the data collection unit 120 may be distributed in whole or in part, e.g., across the seismic recording array 105, in alternative embodiments.

The geological formation 130 presents a seismic reflector 145. As those in the art having the benefit of this disclosure will appreciate, geological formations under survey can be, and usually are, much more complex. For instance, multiple reflectors presenting multiple dipping events may be present. FIG. 1 omits these additional layers of complexity for the sake of clarity and so as not to obscure the present invention.

Still referring to FIG. 1, the seismic source 115 generates a plurality of seismic survey signals 125 in accordance with conventional practice as the survey vessel 110 tows the streamers 107 across the area to be surveyed in a predetermined pattern. The seismic survey signals 125 propagate and are reflected by the subterranean geological formation 130. The receivers 106 detect the reflected signals 135 from the geological formation 130 in a conventional manner. The receivers 106 then generate data representative of the reflections 135, and the seismic data is embedded in electromagnetic signals.

The signals generated by the receivers 106 are communicated to the data collection unit 120. The data collection unit 120 collects the seismic data for processing. The data collection unit 120 may process the seismic data itself; store the seismic data for processing at a later time; transmit the seismic data to a remote location for processing; or some combination of these things. Typically, processing occurs on board the survey vessel 110 or at some later time rather than in the survey vessel 110 because of a desire to maintain production. The data may therefore be stored on a portable magnetic storage medium (not shown) or wirelessly transmitted from the survey vessel 110 to a processing center 140 for processing in accordance with the present invention. Typically, in a marine survey, this will be over satellite links 142 and a satellite 143. Note that some alternative embodiments may employ multiple data collection systems 120.

FIG. 2 illustrates an exemplary land-based seismic survey 200. The seismic survey 200 employs a seismic survey system 202 by which seismic data may be acquired for processing in accordance with the present invention. The seismic survey system 202 includes a seismic recording array 205 and may be constructed in accordance with conventional practice. The recording array 205 includes a plurality of receivers 206 positioned about an area to be surveyed on the surface 207. The receivers 206 are implemented, in the illustrated embodiment, with, e.g., geophones as are known to the art.

FIG. 2 shows a seismic source 215 and a data collection unit 220. The seismic source 115 may be a vibroseis source, such as a vibrator, or an impulse source, such as explosives, as are known in the art. Note that embodiments may employ multiple sources 215 in arrays using techniques known to the art. Those skilled in the art will realize that the embodiments illustrated herein can be extrapolated to apply the present invention to embodiments employing multiple seismic sources 115. The data collection unit 220 is centrally located on the recording truck 210. However, as will be appreciated by those skilled in the art, various portions of the data collection unit 220 may be distributed in whole or in part, e.g., across the seismic recording array 205, in alternative embodiments.

The geological formation 230 presents a seismic reflector 245. As those in the art having the benefit of this disclosure will appreciate, geological formations under survey can be much more complex. For instance, multiple reflectors presenting multiple dipping events may be present. FIG. 2 omits these additional layers of complexity for the sake of clarity and so as not to obscure the present invention.

The seismic source 215 generates a plurality of seismic survey signals 225 in accordance with conventional practice. The seismic survey signals 225 propagate and are reflected by the subterranean geological formation 230. The receivers 206 receive the reflected signals 235 from the geological formation 230 in a conventional manner. The receivers 206 then generate data representative of the reflections 235, and the seismic data is embedded in electromagnetic signals.

The signals generated by the receivers 206 are communicated to the data collection unit 220. Data collected by the receivers 206 is transmitted over the communications link 209 to a data collection unit 220 in the illustrated embodiment. Note that, in some alternative embodiments, the recording array 205 may transmit data collected by the receivers 206 over a wired connection. The data collection unit 220 collects the seismic data for processing. The data collection unit 220 may process the seismic data itself, store the seismic data for processing at a later time, transmit the seismic data to a remote location for processing, or some combination of these things. Typically, processing occurs in camp or at some later time rather than in the recording truck 210 because of a desire to maintain production. The data is therefore stored on a magnetic storage medium, such as a tape 247 or disk array 250, in the recording truck 210 by the data collection unit 220. The magnetic storage medium is then transported to a processing center 140 for processing in accordance with the present invention. Note that some alternative embodiments may employ multiple data collection systems 220.

As previously mentioned, the surveys 100, 200 in FIG. 1, FIG. 2 are exemplary only. The seismic data on which the present invention operates may be collected using practically any kind of seismic survey. For instance, the marine seismic survey 100 shown in FIG. 1 uses the streamer 107. However, some marine surveys are conducted by deploying an ocean bottom cable ("OBC", not shown) on the floor 147. The OBC will include a number of receivers 106 that receive reflections and then generate and transmit data representative of those reflections for storage and/or processing. The present invention may be employed to process seismic data acquired through such a marine survey.

Figure 3:
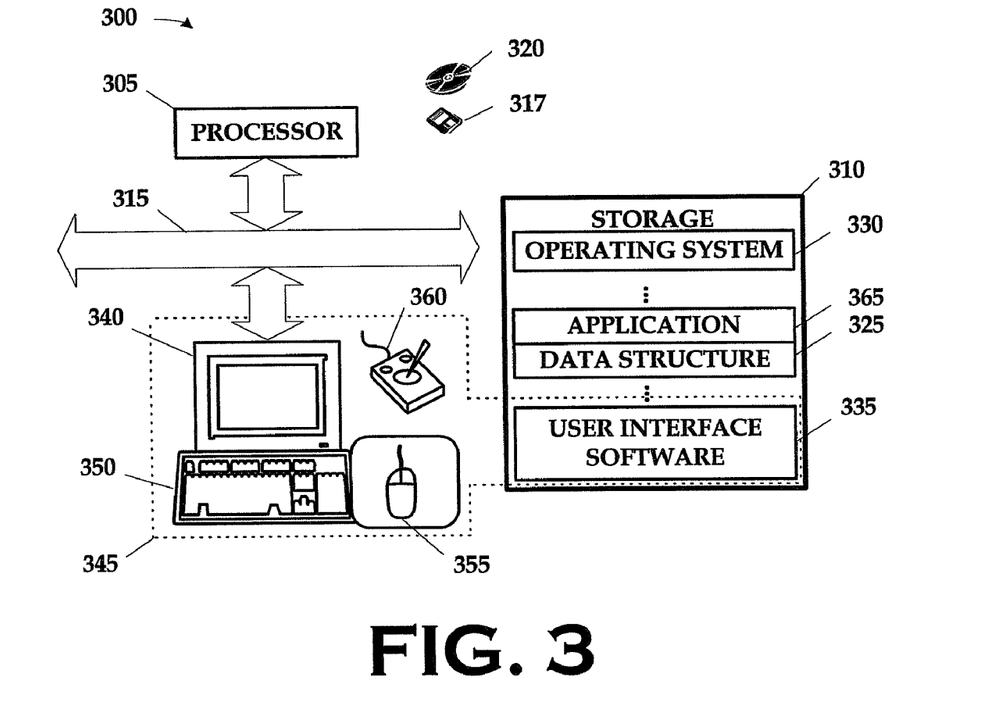
FIG. 3 illustrates a computing system on which some aspects of the present invention may be practiced in some embodiments.

The processing center 140, shown in both FIG. 1 and FIG. 2, is equipped with a rack-mounted computing apparatus 300, illustrated in FIG. 3. The computing apparatus 300 includes a processor 305 communicating with storage 310 over a bus system 315. The storage 310 may include a hard disk and/or random access memory ("RAM") and/or removable storage such as a floppy magnetic disk 317 and an optical disk 320. The storage 310 is encoded with the seismic data 325, acquired as discussed above, in any suitable data structure known to the art. An operating system 330, user interface software 335, and an application 365, also reside on the storage 310. The user interface software 335, in conjunction with a display 340, implements a user interface 345. The user interface 345 may include peripheral I/O devices such as a keypad or keyboard 350, a mouse 355, or a joystick 360. The processor 305 runs under the control of the operating system 330, which may be practically any operating system known to the art. The application 365 is invoked by the operating system 330 upon power up, reset, or both, depending on the implementation of the operating system 330.

The application 365, on invocation, performs a 3D PSWI on the seismic data 325. As is mentioned above, 1D Prestack waveform inversion ("PSWI") is known to the art. One 1D PSWI technique, a methodology based on a genetic algorithm optimization, was previously disclosed in:

Mallick, S., "Model-Based Inversion of Amplitude-Variation-With-Offset Data Using a Genetic Algorithm," 60 Geophysics, 939-954 (1995);

Mallick, S. and Frazer, L. N., "Practical Aspects of Reflectivity Modeling," 52 Geophysics, 1355-1364 (1987);

Mallick, S., "Some Practical Aspects of Prestack Waveform Inversion Using a Genetic Algorithm: an Example from the East Texas Woodbine Gas Sand," 64 Geophysics 326-336 (1999); and Mallick, S., and Frazer, L. N., "Rapid computation of multi offset vertical seismic profile synthetic seismograms for layered elastic media," 53 Geophysics 479-491 (1988).

Each of these papers is hereby expressly incorporated by reference for their teaching of PSWI techniques with the exceptions noted herein arising from the present invention. The references are incorporated as if set forth verbatim herein.

The present invention extends the 1D PSWI technique to a 3D PSWI assuming a locally laterally invariant model. In order to make the 1D PSWI process 3D, the present invention removes the zero dip approximation. This method is an extension of the 1D waveform inversion where the correct source/receiver positions are determined in a locally laterally invariant medium by backprojecting raypaths from each image point using the local dip at that image point. The input to the pre-stack inversion is angle gathers, which are normally converted from offset gathers. The offset to angle transform was described by Walden, AT., "Making AVO Sections More Robust", 39 Geophysical Prospecting, 915-942 (1991), for the zero dip case. Sherrill, F., et al., "Improving AVO and Reflection Tomography Through Use of Local Dip and Azimuth," 71st Ann. Internat'l Mtg., Soc. Expl. Geophysics (2001), showed how this angle decomposition could be extended to the dipping reflector case for locally laterally invariant velocity fields. This involved finding the source and receiver positions that contributed to each image point by back projecting the rays using the local dip at the image point. The same technique is applicable to PSWI. The source and receiver positions, and traveltimes, are found by backprojection.

Figure 4:
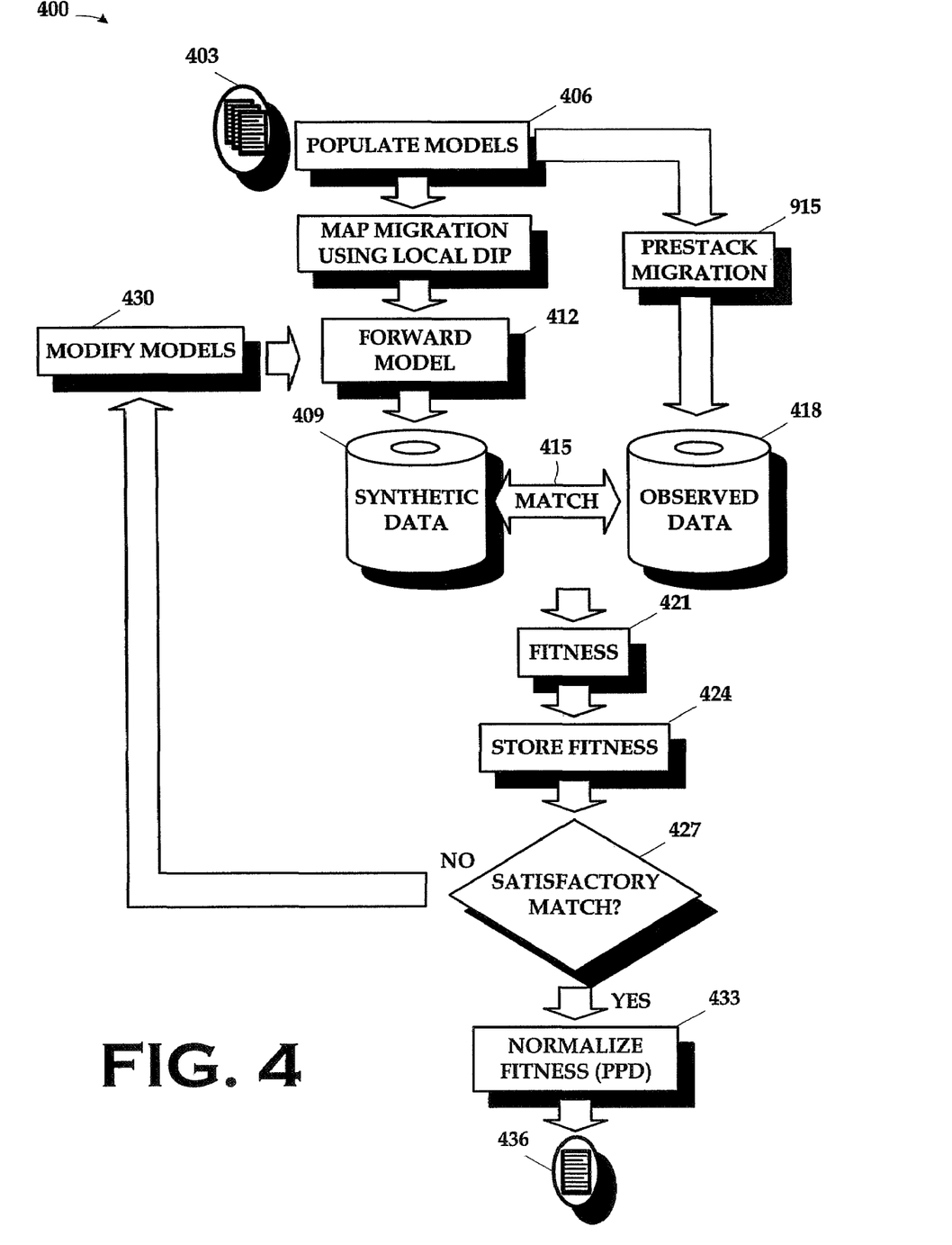
FIG. 4 depicts a three-dimensional, pre-stack, waveform inversion ("PSWI") technique in accordance with one aspect of the present invention.

The PSWI technique 400 of the illustrated embodiment is shown in FIG. 4. The PSWI technique 400 begins with a random population of elastic earth models 403. Some embodiments may employ only a single earth model, however. The models 403 are conceptually illustrated but, in reality, are given as the P- and S-wave velocities ($V_P$ and $V_S$, respectively) and density ($\rho$) as functions of depth. The populated (at 406) models 403 are generated within a user-specified search interval. In general, the macro P-wave velocity model generated using reflection tomography. One consequence of using reflection tomography is that it resolves residual moveout ("RMO") errors.

More technically, RMO correction is used in amplitude variation with offset ("AVO") analysis for producing flattened common image gathers. For tomography, the residual moveout is used in the optimization process for estimating the velocity updates. The correct velocity is the velocity that will produce image gathers which are optimally flat over all offsets.

The RMO for both AVO and tomography is estimated from common image gathers. For AVO, either prestack time or depth migration may be used, but for tomography prestack depth migration is used. The normal procedure for both AVO and tomography is that the RMO analysis is performed on a relatively coarse grid. If RMO is needed on a fine grid, for example for AVO analysis, then there is a separate application for fitting the coarse grid "picks" with a series of low order polynomials. These polynomial functions are found using re-weighted least squares. Once these polynomial fitting functions are determined they may be used to calculate the residual moveout at any position within the 3D volume.

Figure 5:
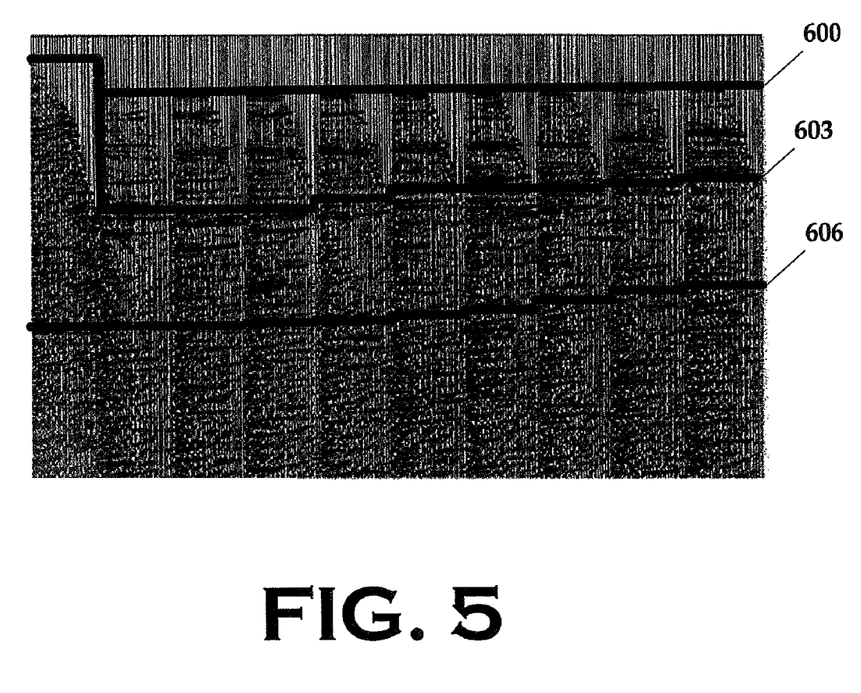
FIG. 5 is a series of ten common image gathers used for estimating residual moveout in a set of observed data.
Figure 6:
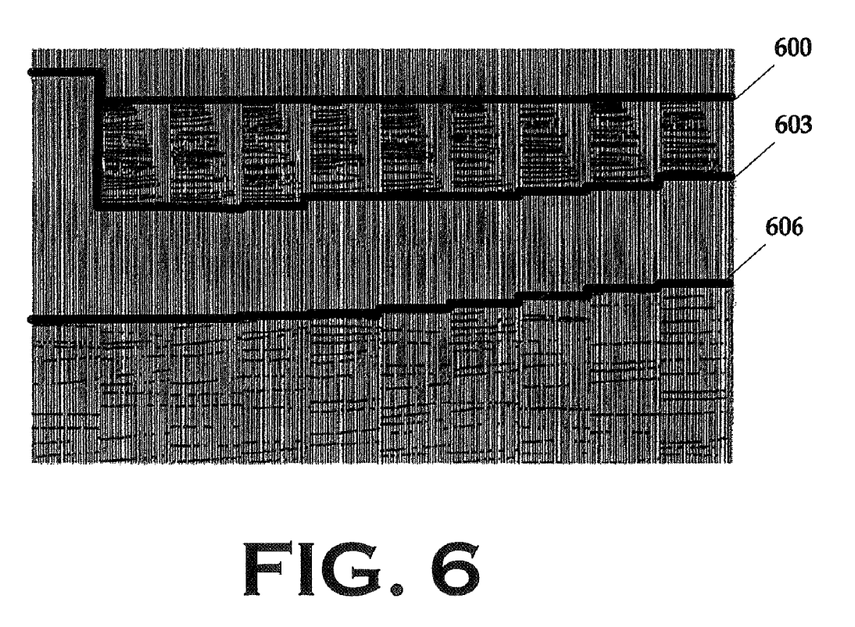
FIG. 6 is a QC plot of the estimated events for the common image gathers in FIG. 5

The method for estimating RMO has four basic steps, generally implemented in the following order: event detection; event curve selection; static correction; and event editing. An event is defined as a series of depths vs. offset for a given common image gather. An example of the final estimated events for a series of common image gathers is shown in the FIG. 5 and FIG. 6. More particularly, FIG. 5 is a series of ten common image gathers input to CIP_PICK, the application for estimating RMO. FIG. 6 is a QC plot of the estimated events for the common image gathers in FIG. 5, including the water bottom 600 and the top 603 and bottom 606 of a salt formation.

In event detection, the depths of the candidate events are determined by the finding the maxima in the trace formed by stacking over a limited offset range. An additional criterion in the event detection phase is the event spacing. In order to improve efficiency, only one event is allowed within a given depth range, and this depth range is depth variable. Generally, this depth separation range will increase with depth to match the resolution limits inherent in reflection seismology. This is evident in FIG. 6, where the events above the salt are sampled more densely than those beneath.

Once the events are detected, the next step, event selection, is to find the parabola, or line, which best matches the residual moveout of the event. As for the dip scan search, the modified semblance formulation in Eq. (1) is used:

$$S = \frac{1}{N} \frac{\left[\sum_{t=1}^{T}\left(\sum_{i=-N/2}^{N/2} f(i, t - i*dt)\right)^P\right]}{\left[\sum_{t=1}^{T}\left(\sum_{i=-N/2}^{N/2} f^2(i, t - i*dt)\right)\right]} \quad (1)$$

where
S=semblance value,
T=semblance window length,
N=semblance scan window (number of traces), and
f(i,t)=data traces (trace i, time t, sample increment dt).

If the value of P in Eq. (1) is 2, then this corresponds to a conventional semblance scan, and is completely insensitive to the data amplitude. If the value of P in equation (1) is 4, then this corresponds to energy semblance, and is sensitive to the data amplitude.

Figure 7:
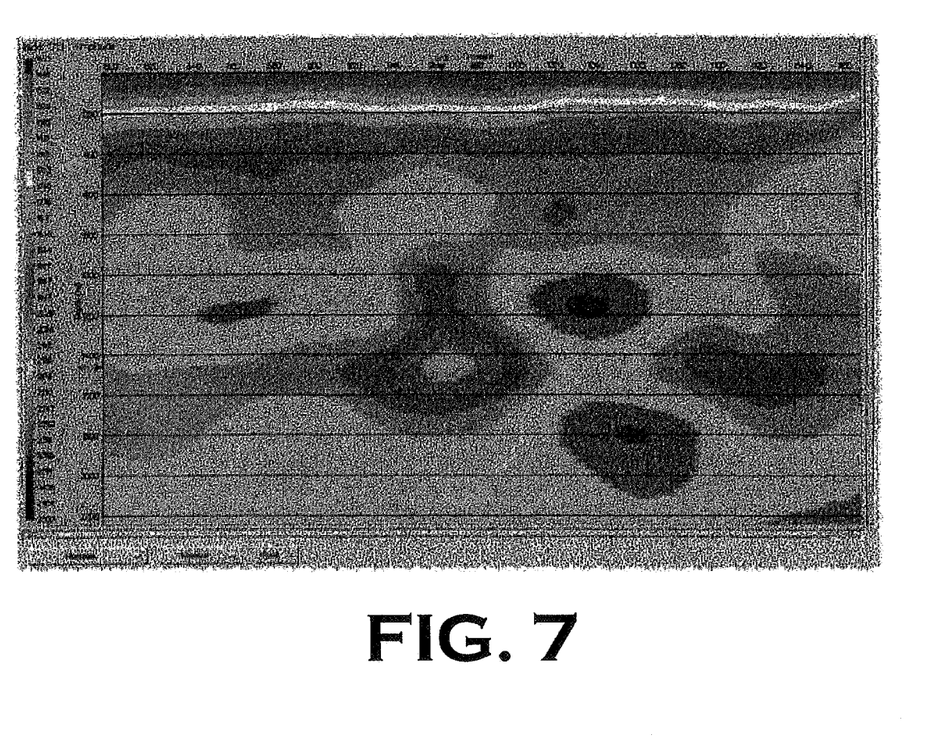
FIG. 7 is an inline cross section of the velocity model of a reservoir in a $CO_2$ sequestration test without demulitple.

Note that contamination from multiples can present difficulties in the automated determination of residual moveout. FIG. 7 presents the results of an attempt to determine if tomography could help delineate the volumetric extent of the injected CO2 in a CO2 sequestration test. More particularly, FIG. 7 is an inline cross section of the velocity model of the reservoir without demulitple. The reservoir is at approximately cross-line 960, and at a depth of between 850 to 1050 meters.

Figure 8:
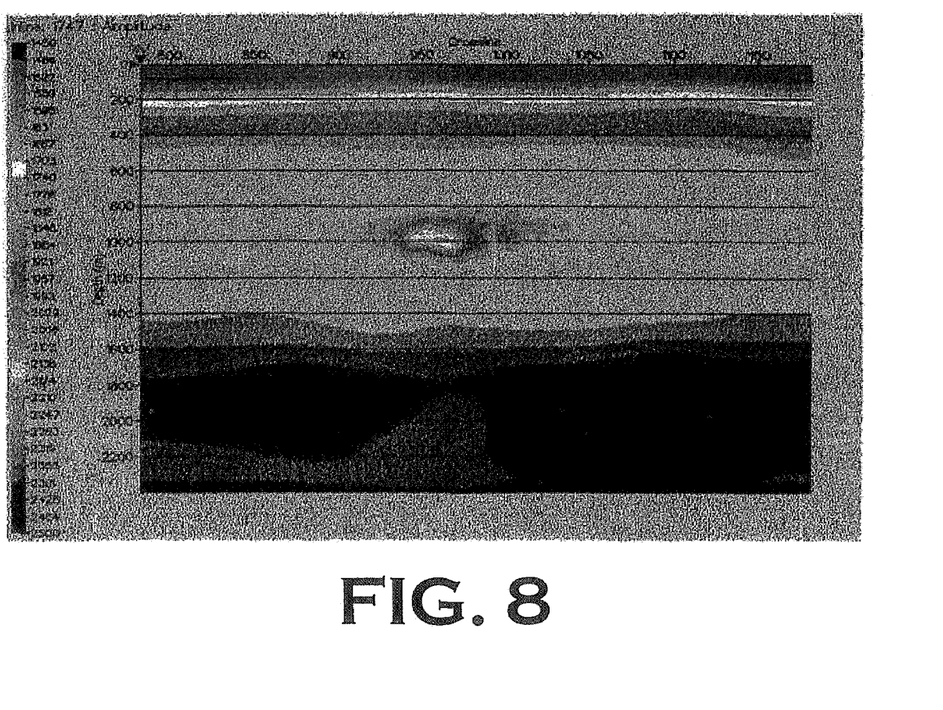
FIG. 8 is an inline cross section of the velocity model for the field modeled in FIG. 7 with demultiple.

The initial tomography result failed to detect the reservoir primarily because of the presence of multiples. FIG. 8 is a inline cross section of the velocity model for the field modeled in FIG. 7 with demultiple in which the $CO_2$ reservoir is now clearly visible. The multiple problem was addressed by a combination of applying radon demultiple to the input gathers, and reducing the curve scan range in the autopicker (cip_pick). T he radon demultiple was effective, but is somewhat contradictory to the goal of automatic determination of residual moveout. The contradiction is that in order to optimally perform the radon demultiple a reasonably accurate estimate of the velocity must be known, but the velocity is the quantity we are trying to determine. The ideal solution would be to combine the demultiple and autopicking functions.

The event selection step is limited to either parabolic, or linear, moveout, as was just mentioned. To accommodate more complex moveout, there is a static component in the autopicker module. The static correction has two parts. First, statics are derived globally, or for the entire event, using re-weighted least squares. This step is very CPU intensive, and the purpose is to reduce the sensitivity of the static estimation to noise. The second part is a more conventional trim static where each trace is adjusted individually relative to a stacked pilot trace. This trim static is very sensitive to the signal-to-noise ("S/N") ratio of the data.

The final step in estimating residual moveout is event editing. The purpose of this step is to reject events that are not spatially consistent. There are currently both 1D and 4D editors. The 1D editor is for consistency in depth (z), and the 4D editor is for consistency in x, y, z and offset.

The method just described is for conventional marine streamer data. Recently, an enhancement was added for estimation of the residual moveout of multi-azimuth data.

This option is required for land and OBC data. The method currently used for multi-azimuth data is to perform the event detection and curve selection phases from the data obtained by stacking over azimuth and to perform only the static adjustment on the individual azimuth bins. This insures that the picks will be azimuthally consistent.

The reflection tomography also employs an estimation of reflector dip. The reflector dip is used in backward projecting the source and receiver rays from the image point back to the respective surface locations. For AVO analysis, the angle of incidence at the reflector is computed from these ray paths. For tomography, the raypaths are used to form the differentials of the velocity with respect to the residual moveout. For both AVO and tomography, the method used is to compute the dip on a fine post stack grid. The dip is determined by finding the plane oriented in the sense of maximum semblance. The inline and cross-line dip components are then determined from this plane. Finally, smoothing is applied to the inline and cross-line dip fields to suppress artifacts in the estimation process.

The illustrated embodiment employs the modified semblance Eq. (1) set forth above in dip estimation, as well, to deal with a problem in which the dip scan often locks in on steep dip, low amplitude interference present in the data. This is most pronounced beneath the salt. If the value of P in Eq. (1) is 2, then this corresponds to a conventional semblance scan, and is completely insensitive to the data amplitude. If the value of P in Eq. (1) is 4, then this corresponds to energy semblance, and is sensitive to the data amplitude. It has been found that increasing the value of P to 4 is somewhat effective in suppressing the interference artifacts, but does not completely solve the problem.

Figure 9:
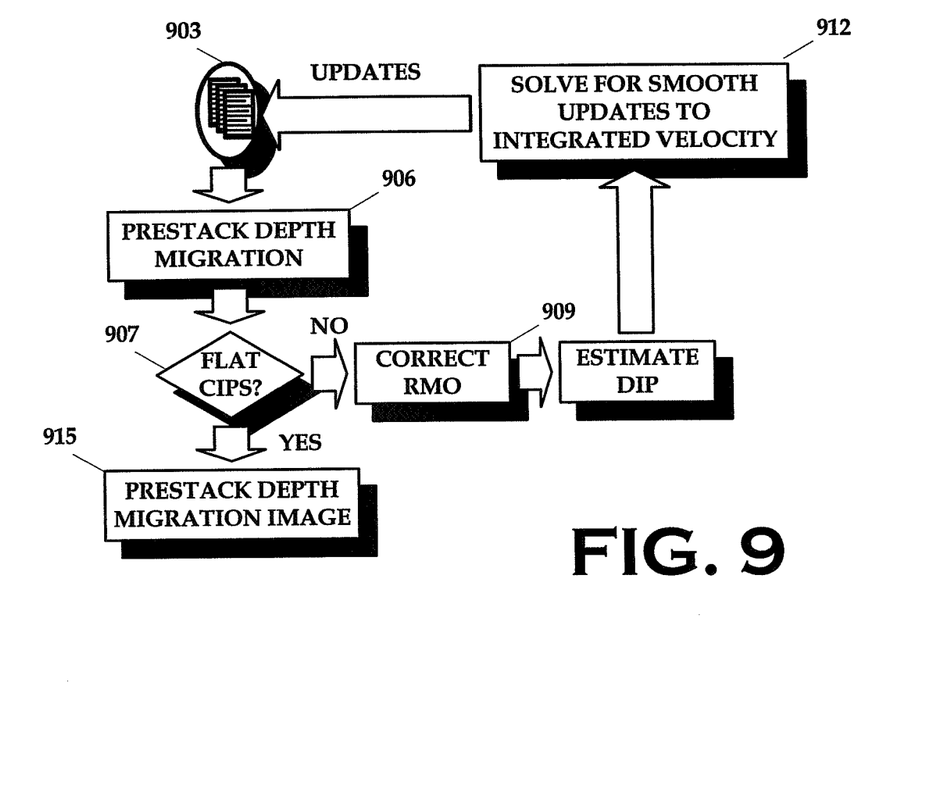
FIG. 9 is a flow diagram for common image point ("CIP") tomography.

Turning now to FIG. 9, a method 800 for constructing and populating the elastic earth models 403, shown in FIG. 4, in accordance with the present invention is shown. In order to make the pre-stack waveform inversion computationally feasible, the input gathers are common image point gathers. In order to satisfy this requirement the background, or macro, P-wave velocity model must be accurate prior to PSWI. This allows the PSWI process to operate on one CIP gather at a time, and separates the imaging process from the PSWI process. If the background model is not accurate then the separation of the imaging process from the PSWI process is not possible, and the computational cost becomes prohibitive. Although not an absolute requirement, the method of choice for solving for the macro P-wave velocity model is CIP tomography. Note that this technique for construction of the P-wave velocity model 403 departs from the conventional, 1D PSWI technique.

A flow diagram for a CIP tomography process 900 is shown in FIG. 9. An initial macro P-wave velocity model 903 is constructed by a velocity model builder (not shown) such as is known in the art. A pre-stack migration (at 906) is performed. For each input CIP gather, rays are back projected from the image point, using the local dip, to the source and receiver positions on the surface, as is discussed further below. This is repeated for each detected event of the current CIP gather, and then the same for all CIP gathers in the data set. For each back projected ray the derivatives of the RMO (in terms of time) are found (at 909) with respect to the local velocity. A velocity field is then found (at 912) using re-weighted least squares which minimize the RMO residuals with which the macro P-wave velocity model 903 is then updated. The whole process in FIG. 9 may be iterated (at 907) several times until a prestack depth migration image 915 is obtained.

Figure 10:
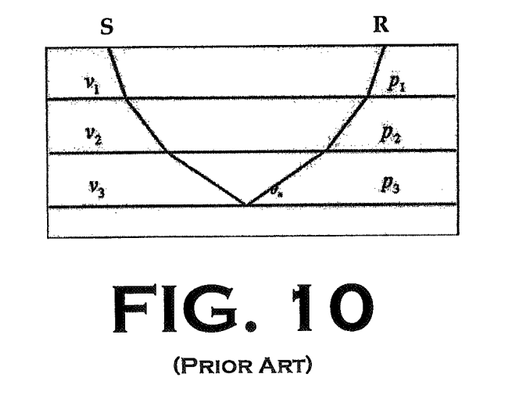
FIG. 10 illustrates source and receiver raypaths for a source and a receiver for a zero dip model in a conventional one-dimensional PSWI process.

As was mentioned above, the back projection of the ray paths is employed in constructing the macro P-wave velocity model 903. This is one of the differences between the conventional 1D PSWI technique and the 3D PSWI technique of the present invention. In the current 1D PSWI method the reflector dip is assumed to be zero, which results in the source and receiver rays paths being equivalent except for the sign of the source and receiver ray parameters, as is shown in FIG. 10. FIG. 10, more particularly, illustrates source and receiver raypaths for a source S and a receiver R for a zero dip model. The source and receiver raypath parameters are invariant since the velocity is locally laterally invariant such that, according to Snell's Law:

$$p_1 = p_2 = p_3 = \frac{\sin(\theta_n)}{v_n} = \left(\frac{dt}{dx}\right)_n \qquad (2)$$

Removing this zero dip limitation in the 1D PSWI technique produces a high fidelity result in areas of moderate to extreme structural complexity.

Figure 11:
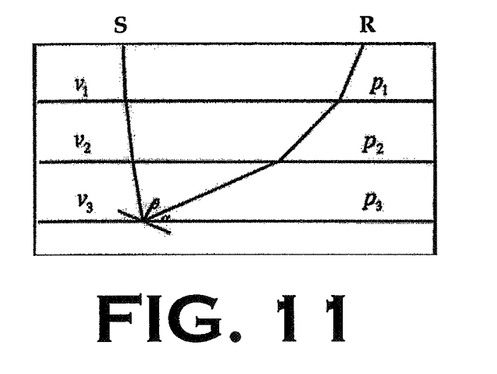
FIG. 11 shows source and receiver raypaths for a source and a receiver for a dipping reflector model as employed in the illustrated embodiment of the present invention.

An example of back projection using the local dip is shown in FIG. 11. More particularly, FIG. 11 shows source and receiver raypaths for a source S and a receiver R for a dipping reflector model, where α=reflector dip and θ=angle of incidence. Since the velocity is assumed to be locally laterally invariant the source and receiver ray parameters are still invariant. This means that the back projection can be done analytically using high order expansions for the travel time as long as the sum of the incident angle plus the reflector dip is below roughly 75°. When this limit is exceeded, paraxial ray tracing is used to locate the source and receiver positions. The correct source and receiver positions S, R are then used in the forward modeling step in the 3D PSWI, as is discussed further below. Note that back projection of the raypaths using the local dip is equivalent to demigration.

Returning to FIG. 4, once the P-wave velocity model 403 is found, the pre-stack waveform inversion can then be performed on one CIP gather at a time, as it is now done in the 1D PSWI process. However, for the 3D PWSI, the forward modeling (at 412) is done from the correct source and receiver positions, found using the demigration procedure described immediately above. The forward modeling algorithm is similar for the 1D inversion as for the 1D inversion since both methods have the same underlying assumption that the velocity is locally laterally invariant. Since the velocity is assumed to be locally laterally invariant the response is azimuthally invariant, and only varies along the radial axis away from the CIP location. There is therefore not a large cost incurred in implementing the 3D option, relative to the 1D option, since modeling of a limited number of radial positions are required in both cases.

Thus, the forward modeling (at 412) uses the elastic world model 403 generated as shown in FIG. 9 to generate, for a least one given common image gather location, a diffraction response for each depth sample, or common image point. Note that this is another departure from the 1D PSWI technique, which is a reflectivity technique.

Typically, an embodiment will generate such a diffraction response for each common image gather location in the elastic world model 403. One suitable modeling technique is disclosed in Mallick, S., and Frazer, L. N. (1988), cited more fully above; and Mallick, S. and Frazer, L. N., (1987), also cited more fully above. Then, for each common image gather location, convert the diffraction response is converted to a migrated reflection response, for each image point, by back projecting rays from the given image point to the surface to find the source-receiver position for each offset (or angle), and travel time, using the local dip at that image point, and using the reflectivity computed from the source-receiver incident angle at the image point.

The computed synthetic seismic data 409 are then compared (at 415) with the observed seismic data 418 to obtain an objective fitness 421, or simply the fitness, of each model 403. The observed data 418 are the prestack depth migration image 915, show in FIG. 9. The fitness is then stored (at 424).

Based on the fitness values (at 427), the random models 403 are then modified (at 430) into the next generation of models 403. In essence, this involves computing residual parameters ($V_p$, $V_s$, density) which minimizes the difference between the model and real data, and then incorporating these residuals into the elastic earth models 403 to update them. Once the new models 403 are obtained, synthetic data 409 for these new models 403 are computed (at 412) and are matched (at 415) with the observed data 418 to obtain the fitness 421 of these new models 403, which are again modified (at 430) into another generation. This process of modifying the models 403 into the next generation of models 403 is continued until convergence, or a user-specified maximum number of generations are achieved. The objective fitness 421 of each of the models 403 generated in the entire course of the run are stored (at 424) in the model space, and at the end of the run, they are normalized (at 433) to compute the a posteriori probability density ("PPD") function in the model space. The inverted model 436 is finally extracted from the interpretation of the PPD.

The particular technique employed by the invention casts the inversion of amplitude-variation-with offset ("AVO") data into the framework of Bayesian statistics. Under such a framework, the model parameters and the physics of the forward problem are used to generate synthetic data. These synthetic data are then matched with the observed data to obtain an a posteriori probability density ("PPD") function in the model space. The genetic algorithm ("GA") uses a directed random search technique to estimate the shape of the PPD. Note that this technique is more fully disclosed in the references cited and incorporated by reference above. To further an understanding of the invention, however, selected portions are excerpted herein.

For the single-layer AVO inversion where the amplitudes from a single reflection event are inverted, GA estimates the normal incidence reflection coefficient ($R_0$) and the contrast of the Poisson's ratio ($\Delta\sigma$) to reasonable accuracy, even when the signal-to-noise ratio is poor. In the multilayer AVO waveform inversion, all or a part of the prestack data are inverted. Inversion of this type is non-unique for the estimation of the absolute values of velocities, Poisson's ratios, and densities. However, by applying simplified approximations to the P-wave reflection coefficient, the reflection coefficient at normal incidence ($R_0$), the contrast in the acoustic impedance ($\Delta A$), and the gradient in the reflection coefficient (G), can be estimated from such an inversion. From the GA estimated values of $R_0$, $\Delta A$ and G, and from reliable estimates of velocity and Poisson's ratio at the start time of the input data, an inverted model can be generated. In addition to P-wave acoustic impedance, GA also obtains an estimate of the Poisson's ratio, an extremely important parameter for the direct detection of hydrocarbons from seismic data.

AVO inversion, like most other geophysical inverse methods, can be cast into the framework of Bayesian statistics. Tarantola, A., "Inverse Problem Theory, Methods for Data Fitting and Parameter Estimation" (Elsevier Science Publ. Co., Inc. 1987). In a Bayesian statistical framework, the model parameters and the physics of the forward problem are used to obtain synthetic data. The synthetic data are then matched with the observed data to estimate an a posteriori probability density ("PPD") in the model space.

For the simplest AVO problem of reflection from a single interface, the model parameters are the P-wave velocity, Poisson's ratio, density for the medium above the reflecting interface, and the contrasts of these quantities across the interface. The physics of the forward problem is expressed by the formula for the plane-wave P-P reflection coefficient as a function of angle-of-incidence or ray-parameter. The synthetic data are the relative variation of the P-P reflection coefficient as a function of angle-of-incidence or ray-parameter for a given model computed using the physics of the forward problem. Finally, the observed data are the relative variations of P-P reflection amplitudes as a function of angle-of-incidence or ray-parameter obtained from relative-amplitude-preserved prestack seismic data.

In the case of a more complex AVO problem involving reflections from multiple layers, the model parameters are the P-wave velocity, Poisson's ratio, density, and thickness for all layers. The physics of the forward problem is expressed by an exact or an approximate elastic wave theory. The synthetic data are the synthetic seismograms computed for a given model, and the observed data are the actual prestack seismic data.

From the fundamentals of statistics, an objective fitness function, such as a normalized cross-correlation that gives the degree of similarity between the observed and the synthetic data, is a measure of the absolute frequency for a given model parameter in its model space. These absolute frequencies, when normalized by their respective cumulative absolute frequencies, give the relative frequencies for each model parameter. Provided each model parameter is accurately sampled in its domain of definition and the a priori probability density functions are uniform, these relative frequencies are proportional to their respective a posteriori probability density ("PPD") functions. The objective of an inverse method is to find the global maxima of the PPD function for each model parameter to get a maximum likelihood estimate of the true model. An inverse problem is said to be unique if its PPD has a well-defined, unique peak in its entire domain of definition. If the PPD is multimodal, consisting of many peaks of nearly equal height, the inverse problem is then non-unique.

The inverse methods may broadly be classified into (1) operator-based or direct-inverse methods, and (2) optimization or model-based inverse methods. In operator-based inversion, observed data are used directly to estimate the model parameters. These are based on certain mathematical models for propagation, and it is usually assumed that such mathematical descriptions are reversible. Born-type inversion, layer stripping inversion, and migration are the examples of operator-based inversion. In model-based inversions, a particular mathematical description of propagation is also assumed. However, unlike operator-based methods, model based methods derive synthetic data and compare them with the observation. After the synthetic data are compared with the observed data, the model parameters are revised and new synthetic data are generated and compared with the observation. The process is repeated until sufficient agreement between the observed and the synthetic data is achieved.

In the linearized model-based inversion, an a priori knowledge of the shape of the PPD is assumed. Generalized linear inversion ("GLI"), where the shape of the PPD is assumed to be a Gaussian, is an example of such inversion. In the nonlinear model-based inversion, no assumption is made regarding the shape of the PPD, and random search procedures are used to estimate the PPD itself. One GLI inversion is known as the "Monte-Carlo" technique. Press, F., "Earth models obtained by Monte-Carlo inversion," 73 J. Geophys. Res., 5223-5234 (1968) ("Press (1968)"). Other examples of nonlinear model-based inversion include enhancements to the Monte Carlo technique, such as simulated annealing ("SA"), taught in:

Kirkpatrick, S., et al., "Optimization by Simulated Annealing," 220 Science 671-680 (1983);

Rothman, D. H., "Nonlinear Inversion, Statistical Mechanics, and Residual Statics Estimation," 50 Geophysics 2784-2796 (1985);

Rothman, D. H., "Automatic Estimation of Large Residual Statics Correction," 51 Geophysics 332-346 (1986);

Aarts, E., & Korst, J., *Simulated Annealing and Boltzmann Machines* (John Wiley & Sons 1989);

Basu, A., & Frazer, L. N., "Rapid Determination of Critical Temperature A in Simulated Annealing Inversion," 249 Science 1410-1412 (1989);

Frazer, L. N., and Basu, A., "Freeze Bath Inversion," 60th Ann. Internat. Mtg., Soc. Expl. Geophys., Expanded Abstracts, 1123-1125 (1990);

Sen, M. K., & Stoffa, P. L., 1991, "Nonlinear One-Dimensional Seismic Waveform Inversion Using Simulated Annealing," 56 Geophysics, 1624-1638 (1991);

and Genetic Algorithm ("GA"), taught in:

Holland, J. H., *Adaptation in Natural and Artificial Systems* (Univ. of Michigan Press 1975);

Goldberg, D. E., *Genetic Algorithms in Search Optimization and Machine Learning* (Addison-Wesley Pub. Co., Inc. 1989);

Frazer, L. N., Basu, A., and Lou, J., "Geophysical Inversion Using Simulated Annealing and Genetic Algorithms," 71 EOS Trans. Am. Geophys. U. 1477 (1990);

Berg, E., "Simple Convergent Genetic Algorithm for the Inversion of Multi Parameter Data," 60th Ann. Internat. Mtg., Soc. Expl. Geophys., Expanded Abstracts, 1126-1128 (1990);

Berg, E., "Convergent Genetic Algorithm for Inversion," 61st Ann. Internat. Mtg., Soc. Expl. Geophys., Expanded Abstracts, 948-950 (1991);

Sen, M. K., & Stoffa, P. L., "Nonlinear One-Dimensional Seismic Waveform Inversion Using Simulated Annealing," 56 Geophysics, 1624-1638 (1991);

Sen, M. K., & Stoffa, P. L., "Genetic Inversion of AVO," 11 The Leading Edge 27-29 (1992);

Sen, M. K., & Stoffa, P. L., "Rapid Sampling of Model Space Using Genetic Algorithms: Examples From Seismic Waveform Inversion," 108 Geophys. J. Int. 281-292 (1992);

Smith, M. L., et al., "Global Search and Genetic Algorithms," 11 The Leading Edge 22-26 (1992);

Mallick, S., Genetic algorithm and the inversion of amplitude-versus-offset data: Presented at the 1992 joint SEG/EAEG summer research workshop, "How Useful is Amplitude-Versus-Offset (AVO) Analysis?" (1992);

Mallick, S., "Inversion of Amplitude-Versus-Offset Data Using Genetic Algorithm," 62nd Ann. Internat. Mtg., Soc. Expl. Geophys., Expanded Abstracts, 844847 (1992).

Mallick, S., "Waveform Inversion of Amplitude-Versus-Offset Data Using a Genetic Algorithm," 63rd Ann. Internat. Mtg., Soc. Expl. Geophys., Expanded Abstracts, 750-753 (1993);

Nolte, B., & Frazer, L. N., "VSP Inversion With Genetic Algorithms," 73 EOS Trans. Am. Geophys. U. 350, Presented at the 1992 Mtg., Am. Geophys. U.

The linear inversions, which assume the shape of the PPD to be known, are local optimization procedures and are heavily influenced by the choice of the initial model. Nonlinear inversions, on the other hand, are global inversion procedures and do not depend upon the initial model. Since the AVO problem is typically non-unique, a global procedure is employed herein for the inversion of AVO.

In a pure Monte-Carlo approach to the nonlinear model-based inversion as used by Press (1968), each model parameter is allowed to vary within a specified search interval, and a suite of random models is generated within the interval. A model is accepted based on the value of its fitness. Computations are stopped when a large number of acceptable models is obtained. The search procedure in this method is directionless; consequently, such an exhaustive Monte-Carlo search is almost always expensive. In contrast to the pure Monte-Carlo, simulated annealing and genetic algorithms may be regarded as directed Monte-Carlo procedures. Like pure Monte-Carlo, SA and GA initially generate a random suite of models within a specified search interval and their fitness values are calculated. In successive steps, however, SA and GA tend to generate new suites of models having fitness values higher than those in the previous steps. The procedure is continued until many models fitting the data to acceptable accuracy are obtained. In directing the search process, SA uses the analogy of the process of crystallization from a melt, whereas GA uses the analogy of the process of biological evolution occurring in nature.

The illustrated embodiment applies the GA for the AVO inversion, although this is not necessary to the practice of the invention. Alternative embodiments may employ SA, instead. Both SA and GA are suitable choices for nonlinear, multiparameter inversion problems. Equally efficient AVO inversion techniques can possibly be developed for both. Recently, GA was compared to a new method called very fast simulated reannealing ("VFSR"). Ingber, L., and Rosen, B., "Genetic Algorithms and Very Fast Simulated Reannealing: A Comparison," 16 Math. Comput. Modeling 87-100 (1992). Inber and Rosen claim that VFSR is able to find the global maxima an order of magnitude faster than GA such that VFSR may also be suitable.

The genetic algorithm is documented in Goldberg, D. E., *Genetic Algorithms in Search Optimization and Machine Learning* (Addison-Wesley Pub. Co., Inc. 1989). Applications of GA to geophysics are given by:

Sen, M. K., & Stoffa, P. L., "Nonlinear One-Dimensional Seismic Waveform Inversion Using Simulated Annealing," 56 Geophysics, 1624-1638 (1991);

Sen, M. K., & Stoffa, P. L., "Genetic Inversion of AVO," 11 The Leading Edge 27-29 (1992);

Sen, M. K., & Stoffa, P. L., "Rapid Sampling of Model Space Using Genetic Algorithms: Examples From Seismic Waveform Inversion," 108 Geophys. J. Int. 281-292 (1992);

Mallick, S., Genetic algorithm and the inversion of amplitude-versus-offset data: Presented at the 1992 joint SEG/EAEG summer research workshop, "How Useful is Amplitude-Versus-Offset (AVO) Analysis?" (1992);

Mallick, S., "Inversion of Amplitude-Versus-Offset Data Using Genetic Algorithm," 62nd Ann. Internat. Mtg., Soc. Expl. Geophys., Expanded Abstracts, 844847 (1992);

Mallick, S., "Waveform Inversion of Amplitude-Versus-Offset Data Using a Genetic Algorithm," 63rd Ann. Internat. Mtg., Soc. Expl. Geophys., Expanded Abstracts, 750-753 (1993); and Nolte, B., & Frazer, L. N., "VSP Inversion With Genetic Algorithms," 73 EOS Trans. Am. Geophys. U. 350, Presented at the 1992 Mtg., Am. Geophys. U.

In principle, GA consists of the four basic steps: (1) parameter coding, (2) reproduction, (3) crossover, and (4) mutation.

One example of parameter coding is to code each model parameter as an unsigned binary string. The coded binary strings for each parameter of a particular model are then concatenated to form a chromosome. Each chromosome therefore represents a model. Once a random population of chromosomes is generated, each member of the population is decoded for the actual parameter values. Next, a forward modeling procedure is used to obtain the synthetic data for each model (chromosome). These synthetic data are then cross-correlated with the observed AVO data to obtain a raw fitness for each chromosome.

Once a random population of chromosomes is generated and their respective raw fitness values are computed, the next step is to scale these fitness values. The reason for fitness scaling is to avoid a rapid convergence of GA to a local maxima (see Goldberg, 1989, for details). In linear fitness scaling (Goldberg, 1989, 76-79), the raw fitness values are linearly scaled, whereas in exponential fitness scaling (Stoffa and Sen, 1991; Sen and Stoffa, 1992b), they are exponentially scaled. For the class of AVO inversion presented here, a linear scaling always gave better results than an exponential scaling.

After the fitness of each chromosome is scaled, in the reproduction process chromosomes are reproduced in numbers proportional to their scaled fitness values. Stochastic remainder selection without replacement (Goldberg, 1989, 120-122) is a good choice for the reproductive scheme. In the next step, crossover, two chromosomes from the reproduced population are randomly chosen as parents. With a given probability of crossover $P_c$, the gene (bit) contents between the two parents are partially swapped to produce two children. In a single-point crossover, a single crossover site is randomly selected, and the genes between the parents are exchanged on the right-hand side of this crossover site. In multiple-point crossover, there is one crossover site corresponding to each model parameter (Stoffa and Sen, 1991; Sen and Stoffa, 1992b).

For the class of AVO inversion shown here, a multiple-point crossover worked better than the single-point crossover. A moderately high value between 0.6 and 0.8 was found to be a reasonable choice for $P_c$. Crossover is followed by mutation, where the genes in each child are changed with a given probability of mutation $P_m$. Reproduction, crossover, and probability of mutation take one generation of chromosomes into the next; a value of 0.3 in the first ten generations and 0.01 beyond are reasonable choices for $P_m$.

Although reproduction, crossover, and mutation constitute the basic building blocks of GA, for the AVO inversion the algorithm does not quite work unless an additional operation, namely update (Stoffa and Sen, 1991; Sen and Stoffa, 1992b), is used. In update, the fitness values for the two children and their parents are compared, and the two with the highest fitness values are copied into the next generation with a specified probability of update $P_u$. Note that when the population is not updated, the children are always copied into the next generation. A value of 0.6 in the first ten generations and 0.9 beyond is a good choice for $P_u$. This update is slightly different from the update used by Stoffa and Sen (1991) and Sen and Stoffa (1992b). Berg (1990) used an update similar to the one used herein, but with $P_u=1$. A similar concept was also used by Hollstien, R. B., "Artificial genetic adaptation in computer control systems," 32(3) Dissertation Abstracts Int. 1510B (University microfilm no. 71-23, 773) (1971), and Cavicchio, D. J., "Reproductive Adaptive Plans," Proc. of the ACM 1972, Annual Conference, 1-11 (1972).

In the GA optimization of multimodal functions having numerous peaks in the PPD, there is no selective advantage of one peak over the other. However, Goldberg, D. E., and Segrest, P., "Finite Markov chain analysis of genetic algorithms," in Grefenstette, J. J. (Ed.), Genetic algorithms and their applications, Proc. of the 2nd Internat. Conf. on Genetic Algorithms, 1-8. (1987), found that after a finite number of generations, GA usually converges to one of the peaks. This problem, known as "genetic drift," results from the stochastic error caused by finite population sizes.

One way to avoid genetic drift is to have a large population size. However, the expense of long computer runs mitigates against making the size of the population too large. To circumvent the problem of genetic drift caused by finite population sizes, Holland, J. H., *Adaptation in Natural and Artificial System* (Univ. of Michigan Press. 1975) introduced the concept of sharing, in which the objective fitness of the neighborhood of a particular point in the model space is degraded in proportion to the number of members sharing that neighborhood. Goldberg, D. E., & Richardson, J., "Genetic algorithms with sharing for multimodal function optimization," in Grefenstette, J. J. (Ed.), Genetic algorithms and their applications, Proc. of the 2nd Internat. Conf. on Genetic Algorithms, Lawrence Erlbaum, 41-59 (1987), successfully applied sharing in optimizing multimodal functions in one dimension. In multidimensional optimization such as AVO inversion, a parallel genetic algorithm, based on the concept of punctuated equilibria, see Cohoon, J. P., et al., "Punctuated equilibria: A parallel genetic algorithm," in Grefenstette, J.J. (Ed.), Genetic algorithms and their applications: Proc. of the 2nd Internat. Conf., on Genetic Algorithms, Lawrence Erlbaum, 148-154 (1987), is preferable to sharing. This approach was also proposed by Sen and Stoffa (1992) in their prestack waveform inversion examples. In parallel GA, many GAs are run in parallel, and the output from all such runs is combined while estimating the PPD.

The output of GA is the a posteriori probability density ("PPD") in the model-space. In addition to the PPD, two other quantities, namely the mean model and the posterior model covariance, can also be computed practically at no extra cost. Physically, the mean model denotes the mean model estimated in the course of the run. The posterior model covariance is a symmetric N×N matrix (N being the number of model parameters). The square root of the diagonal elements of this matrix denotes the standard deviation (error bars) of the respective model parameters from their estimated mean, whereas the off-diagonal elements of this matrix denote the dependence of one model parameter upon another (Sen and Stoffa, 1992b).

To see how the PPD, mean model, and posterior model covariance are computed, denote the model as a vector m, given by:

$$m=[m_1, m_2, \ldots]^T, \quad (1)$$

where $m_1, m_2, \ldots$ etc. are different model parameters (such as P-wave velocity, density, etc.), and the superscript T denotes a transpose. A model m is associated with a raw fitness f(m), obtained by cross-correlating the observed data with the synthetic data generated from the model. The probability of a model m being selected in reproduction is given by:

$$\overline{P}_m = \frac{S[f(m)]}{\sum S[f(m_j)]}, \quad (2)$$

where S[f(m)] is the scaled fitness of the model m. The scaled fitness can be a linearly scaled fitness of Goldberg (1989) or an exponentially scaled fitness of Sen and Stoffa (1992b). When the summation in the denominator of Eq. (2) is over all the members (models) in a particular generation, P(m) represents the probability with which reproduction selects a model m to be copied into the next generation.

For a typical AVO inversion problem, the model parameters usually lie within a given interval in the model space, and there is no a priori knowledge of what value each parameter is likely to have within its search interval. It is therefore reasonable to assume that the a priori probability density function for each model parameter is uniform within its search interval. Under such an assumption, if the summation in the denominator of Eq. (2) is over all the models generated in the entire course of the GA run, P(m) in Eq. (2) becomes the PPD. Note that the PPD P(m) is an N×M matrix, where N is the number of model parameters and M is the number of values each model parameter can take. Row 1 for this matrix represents the PPD for the model parameter 1; row 2 is the PPD for the model parameter 2; and so on.

The mean model $\langle m \rangle$ is given by (see Sen and Stoffa, 1992b)

$$\langle m \rangle = \int dm \cdot m P(m), \quad (3)$$

approximated by the sum $$\langle m \rangle = \Sigma m \overline{P}(m), \quad (4)$$

Finally, the posterior model covariance matrix $\underline{C}_m$ is given by (Tarantola, 1987)

$$\underline{C}_m = \int dm \cdot m \cdot m^T P(m) - \langle m \rangle \langle m \rangle^T, \quad (5)$$

approximated as $$\underline{C}_m = \Sigma m \cdot m^T \overline{P}(m) - \langle m \rangle \langle m \rangle^T, \quad (6)$$

The PPD P(m), the mean model $\langle m \rangle$, and the model covariance $\underline{C}_m$ can be computed using the binning technique of Frazer and Basu (1990). The exact procedure of computing each of the above quantities can be found in Sen and Stoffa (1992b) and therefore is not repeated here.

Figure 12:
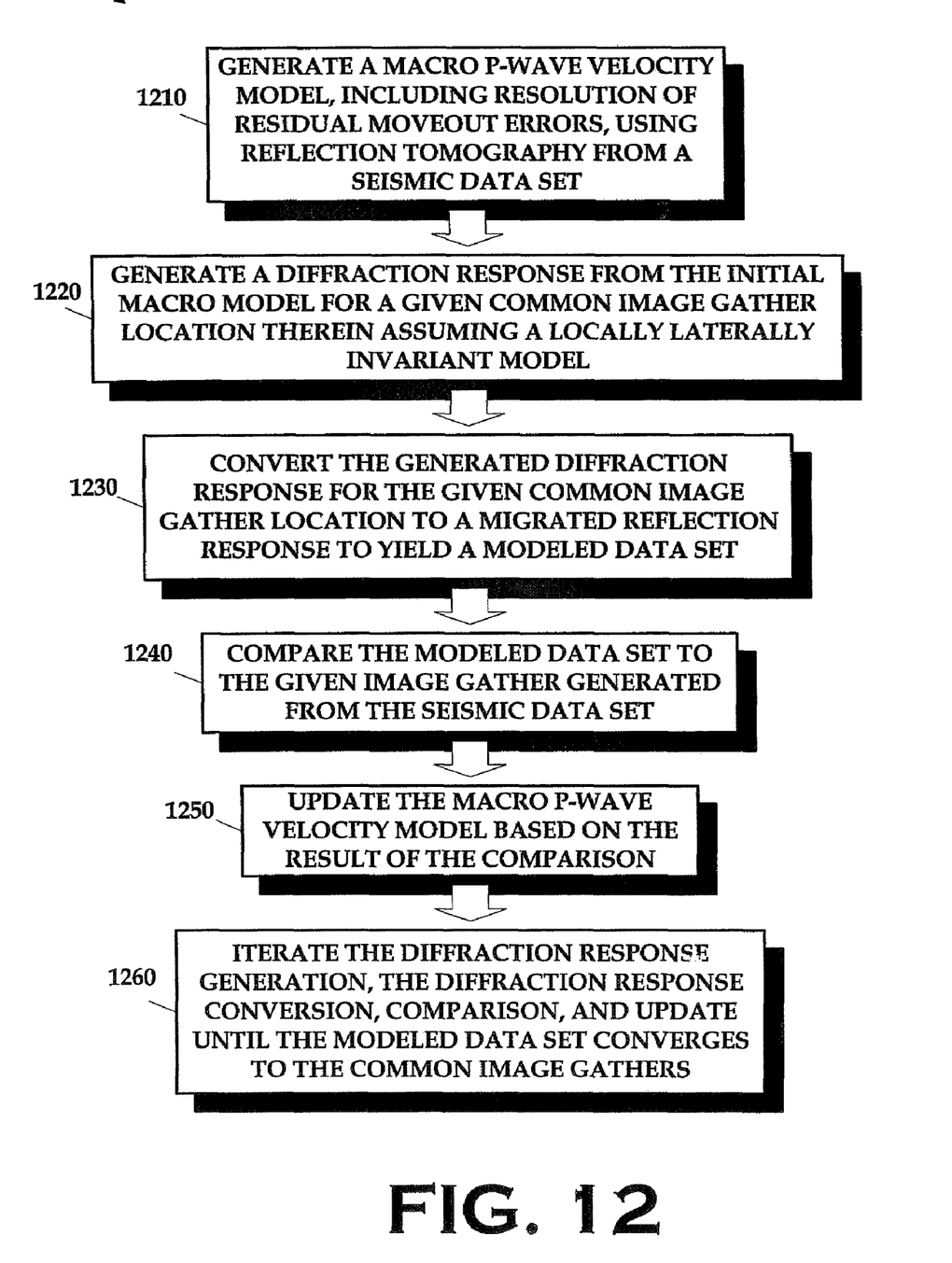
FIG. 12 illustrates a technique for extending pre-stack waveform algorithms from 1D to 3D in accordance with the present invention.

FIG. 12 illustrates one particular embodiment of a method 1200 in accordance with one particular aspect of the present invention, the method 1200, comprising:

generating (at 1210) a macro P-wave velocity model, including resolution of residual moveout errors, using reflection tomography from a seismic data set;

generating (at 1220) a diffraction response from the initial macro model for a given common image gather location therein assuming a locally laterally invariant model;

converting (at 1230) the generated diffraction response for the given common image gather location to a migrated reflection response to yield a modeled data set;

comparing (at 1240) the modeled data set to the given image gather generated from the seismic data set;

updating (at 1250) the macro P-wave velocity model based on the result of the comparison; and iterating (at 1260) the diffraction response generation, the diffraction response conversion, comparison, and update until the modeled data set converges to the common image gathers.

In the illustrated embodiment, converting (at 1230) the generated diffraction response for the given common image gather location to a migrated reflection response includes back projecting rays from the given image point to find the source-receiver position and travel time for each interval (i.e., an offset or an angle) using the local dip at that image point, and using the reflectivity computed from the source-receiver incident angle at the image point Comparing (at 1240) the modeled data set to the common image gathers includes computing a residual velocity which minimizes the difference between the modeled data and the common image gathers.

In the illustrated embodiment, certain portions of the method are performed on a computing apparatus, i.e., the computing apparatus 300 in FIG. 3 by the application 365 residing on the storage 310. More typically, however, the actions will not be performed in the field, but rather at the processing center 140, shown in FIG. 1.

Figure 13:
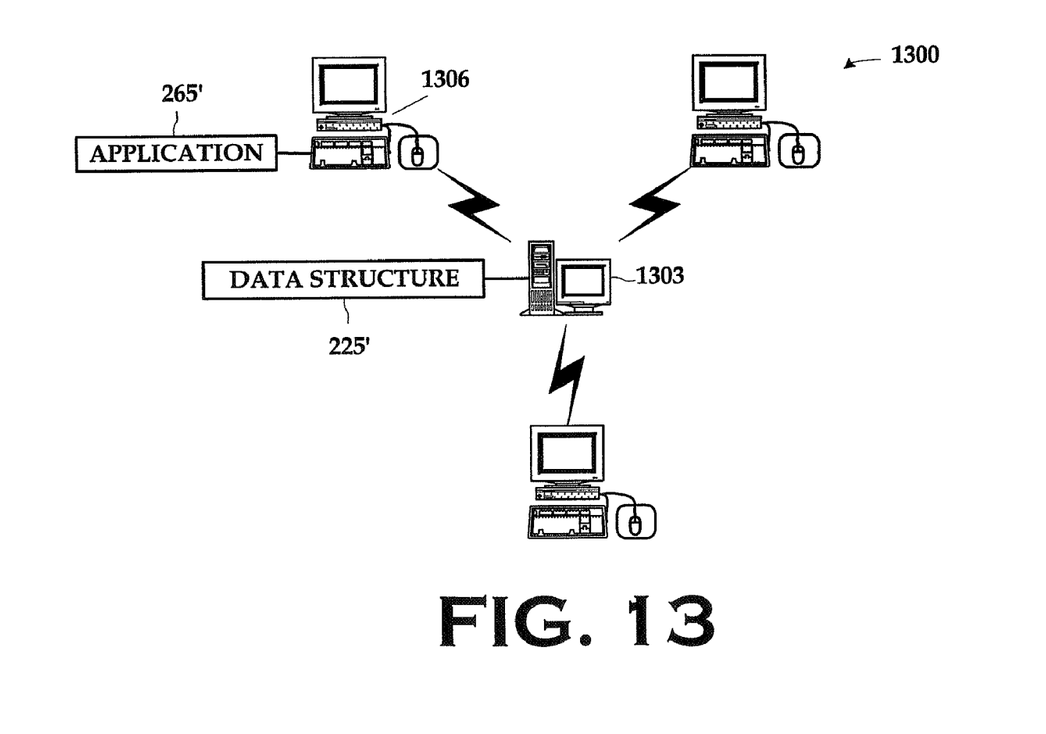
FIG. 13 illustrates a computing system on which some aspects of the present invention may be practiced in some embodiments.

Furthermore, there is no need for the seismic data to reside on the same computing apparatus as the application by which it is processed. Some embodiments of the present invention may therefore be implemented on a computing system, e.g., the computing system 1300 in FIG. 13, comprising more than one computing apparatus. For example, the seismic data may reside in a data structure 225' residing on a server 1303 and the application 265' by which it is processed on a workstation 1306 where the computing system 1300 employs a networked client/server architecture. However, there is no requirement that the computing system 1300 be networked in all embodiments. Alternative embodiments may employ, for instance, a peer-to-peer architecture or some hybrid of a peer-to-peer and client/server architecture. The size and geographic scope of the computing system 1300 is not material to the practice of the invention. The size and scope may range anywhere from just a few machines of a Local Area Network ("LAN") located in the same room to many hundreds or thousands of machines globally distributed in an enterprise computing system.

As is apparent from the discussion above, at least some portions of the present invention are software implemented. Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   generating a macro P-wave velocity model, including resolution of residual moveout errors, using reflection tomography from a seismic data set;
   generating a diffraction response from the macro P-wave velocity model for a given common image gather location therein assuming a locally laterally invariant model;
   converting the generated diffraction response for the given common image gather location to a migrated reflection response to yield a modeled data set;
   comparing the modeled data set to the given common image point from the seismic data set;
   updating the macro P-wave velocity model based on the result of the comparison; and
   iterating the diffraction response generation, the diffraction response conversion, comparison, and update until the modeled data set converges to the common image gathers.

2. The method of claim 1, wherein converting the generated diffraction response for the given common image gather location to a migrated reflection response includes back projecting rays from the given image point to find the source-receiver position and travel time for each interval using the local dip at that image point, and using the reflectivity computed from the source-receiver incident angle at the image point.

3. The method of claim 2, wherein the interval is an offset or an angle.

4. The method of claim 1, wherein comparing the modeled data set to the common image gathers includes computing a residual velocity which minimizes the difference between the modeled data and the common image gathers.

5. A program storage medium encoded with instructions that, when executed by a computing device, perform a method comprising:
   generating a macro P-wave velocity model, including resolution of residual moveout errors, using reflection tomography from a seismic data set;
   generating a diffraction response from the macro P-wave velocity model for a given common image gather location therein assuming a locally laterally invariant model;
   converting the generated diffraction response for the given common image gather location to a migrated reflection response to yield a modeled data set;
   comparing the modeled data set to the given common image point from the seismic data set;
   updating the macro P-wave velocity model based on the result of the comparison; and
   iterating the diffraction response generation, the diffraction response conversion, comparison, and update until the modeled data set converges to the common image gathers.

6. The program storage medium of claim 5, wherein converting the generated diffraction response for the given common image gather location to a migrated reflection response in the encoded method includes back projecting rays from the given image point to find the source-receiver position and travel time for each interval using the local dip at that image point, and using the reflectivity computed from the source-receiver incident angle at the image point.

7. The program storage medium of claim 6, wherein the interval is an offset or an angle.

8. The program storage medium of claim 5, wherein comparing the modeled data set to the common image gathers in the encoded method includes computing a residual velocity which minimizes the difference between the modeled data and the common image gathers.

9. The program storage medium of claim 5, furthermore encoded with the seismic data set.

10. A computing apparatus, comprising:
    a computing device;
    a bus system;
    a storage communicating with the computing device over the bus system;
    an application residing on the storage that, when executed by the computing device, performs a method including:
       generating a macro P-wave velocity model, including resolution of residual moveout errors, using reflection tomography from a seismic data set;
       generating a diffraction response from the macro P-wave velocity model for a given common image gather location therein assuming a locally laterally invariant model;
       converting the generated diffraction response for the given common image gather location to a migrated reflection response to yield a modeled data set;

comparing the modeled data set to the given common image point from the seismic data set;

updating the macro P-wave velocity model based on the result of the comparison; and iterating the diffraction response generation, the diffraction response conversion, comparison, and update until the modeled data set converges to the common image gathers.

11. The computing apparatus of claim 10, wherein converting the generated diffraction response for the given common image gather location to a migrated reflection response in the programmed method includes back projecting rays from the given image point to find the source-receiver position and travel time for each interval using the local dip at that image point, and using the reflectivity computed from the source-receiver incident angle at the image point.

12. The computing apparatus of claim 11, wherein the interval is an offset or an angle.

13. The computing apparatus of claim 10, wherein comparing the modeled data set to the common image gathers in the programmed method includes computing a residual velocity which minimizes the difference between the modeled data and the common image gathers.

14. The computing apparatus of claim 10, further comprising the seismic data set.

15. The computing apparatus of claim 10, wherein the seismic data set resides on the storage.

16. A method, comprising:
(i) generate macro P-wave velocity model, and resolve all RMO errors, using reflection tomography;
(ii) using the macro model generated in step (i), for each common image gather location, generate a diffraction response for each depth sample, or common image point for a locally laterally invariant model;
(iii) for each common image gather location, convert the diffraction response to a migrated reflection response, for each image point, by back projecting rays from the given image point to the surface to find the source-receiver position for each offset (or angle), and time, using the local dip at that image point, and using the reflectivity computed from the source-receiver incident angle at the image point;
(iv) for each common image gather location, compare the modeled data generated the previous two steps, to the real data, and compute a residual velocity which minimizes the difference between the model and real data, the real data being the common image gather; and
(v) iterate (ii)-(iv) until the model converges to the real data within some suitable threshold.

17. A program storage medium encoded with instructions that, when executed by a computing device, perform a method comprising:
(i) generate macro P-wave velocity model, and resolve all RMO errors, using reflection tomography;
(ii) using the macro model generated in step (i), for each common image gather location, generate a diffraction response for each depth sample, or common image point for a locally laterally invariant model;
(iii) for each common image gather location, convert the diffraction response to a migrated reflection response, for each image point, by back projecting rays from the given image point to the surface to find the source-receiver position for each offset (or angle), and time, using the local dip at that image point, and using the reflectivity computed from the source-receiver incident angle at the image point;
(iv) for each common image gather location, compare the modeled data generated the previous two steps, to the real data, and compute a residual velocity which minimizes the difference between the model and real data, the real data being the common image gather; and
(v) iterate (ii)-(iv) until the model converges to the real data within some suitable threshold.

18. A program storage medium encoded with instructions that, when executed by a computing device, perform a method comprising:
a computing device;
a bus system;
a storage communicating with the computing device over the bus system;
an application residing on the storage that, when executed by the computing device, performs a method including:
(i) generate macro P-wave velocity model, and resolve all RMO errors, using reflection tomography;
(ii) using the macro model generated in step (i), for each common image gather location, generate a diffraction response for each depth sample, or common image point for a locally laterally invariant model;
(iii) for each common image gather location, convert the diffraction response to a migrated reflection response, for each image point, by back projecting rays from the given image point to the surface to find the source-receiver position for each offset (or angle), and time, using the local dip at that image point, and using the reflectivity computed from the source-receiver incident angle at the image point;
(iv) for each common image gather location, compare the modeled data generated the previous two steps, to the real data, and compute a residual velocity which minimizes the difference between the model and real data, the real data being the common image gather; and
(v) iterate (ii)-(iv) until the model converges to the real data within some suitable threshold.

* * * * *